(12) United States Patent  
Kaiser (10) Patent No.: US 7,587,324 B2  
(45) Date of Patent: Sep. 8, 2009

(54) METHODS AND SYSTEMS FOR DETECTING USER SATISFACTION

(75) Inventor: Matthias Kaiser, Mountain View, CA (US)

(73) Assignee: SAP AG, Walldorf (DE)

( * ) Notice: Subject to any disclaimer, the term of this patent is extended or adjusted under 35 U.S.C. 154(b) by 1086 days.

(21) Appl. No.: 10/811,971

(22) Filed: Mar. 30, 2004

(65) Prior Publication Data

US 2005/0246211 A1    Nov. 3, 2005

(51) Int. Cl.
G06F 17/60 (2006.01)
G08F 15/00 (2006.01)
H04M 3/08 (2006.01)
H04M 3/00 (2006.01)

(52) U.S. Cl. .......... 705/1; 715/500.1; 715/514; 715/526; 379/32.01; 379/67.1; 379/265.02; 705/11; 705/26

(58) Field of Classification Search .............. None
See application file for complete search history.

(56) References Cited

U.S. PATENT DOCUMENTS

| | | | | |
|---|---|---|---|---|
| 5,724,262 A * | 3/1998 | Ghahramani | ................ | 702/186 |
| 5,808,908 A * | 9/1998 | Ghahramani | ................ | 702/182 |
| 6,363,145 B1 * | 3/2002 | Shaffer et al. | .......... | 379/265.02 |
| 6,868,154 B1 * | 3/2005 | Stuart et al. | ............. | 379/265.06 |
| 7,069,560 B1 * | 6/2006 | Cheyer et al. | ................ | 719/317 |
| 7,191,133 B1 * | 3/2007 | Pettay | ......................... | 704/270 |
| 7,281,201 B2 * | 10/2007 | Kumar et al. | ................ | 715/255 |
| 7,457,404 B1 * | 11/2008 | Hession et al. | ......... | 379/265.07 |
| 2003/0163380 A1 * | 8/2003 | Vaccarelli et al. | ............. | 705/26 |
| 2005/0043987 A1 * | 2/2005 | Kumar et al. | ................. | 705/11 |
| 2006/0140389 A1 * | 6/2006 | Stuart et al. | ............. | 379/265.02 |
| 2006/0188075 A1 * | 8/2006 | Peterson | .................... | 379/67.1 |
| 2007/0025528 A1 * | 2/2007 | Knott et al. | ............... | 379/32.01 |

FOREIGN PATENT DOCUMENTS

WO    WO 03/009175 A1 *    1/2003

OTHER PUBLICATIONS

Nice Packet 1-6 attached.*

* cited by examiner

*Primary Examiner*—John G. Weiss
*Assistant Examiner*—Matthew L Brooks
(74) *Attorney, Agent, or Firm*—Mintz, Levin, Cohn, Ferris, Glovsky & Popeo, P.C.

(57) ABSTRACT

Methods and systems are provided to detect user satisfaction based on user interaction patterns and properties. Methods and systems may monitor an interaction between a user and a computer and may compare the monitored interaction with a baseline value to determine a deviation from baseline. The deviation may be used to determine a value for user satisfaction. Methods and systems may improve user satisfaction by tracking user actions during an interaction with an application and determining if the user actions deviate from an application script corresponding to the interaction. A link from a deviated action to a next logical point in a task script may be provided.

18 Claims, 6 Drawing Sheets

METHODS AND SYSTEMS FOR DETECTING USER SATISFACTION

TECHNICAL FIELD

The present invention generally relates to data processing and, more particularly, to methods and systems for implicitly detecting user satisfaction based on interaction patterns and properties.

BACKGROUND

Customer satisfaction is a primary determinant of business success. Organizations not only gain competitive advantage by providing customers the highest levels of satisfaction, but they also increase profitability. The link between customer satisfaction and profitability has prompted many organizations to institute Customer Relationship Management (CRM) programs. CRM details many aspects of interaction that a company has with its customers. CRM generally includes a set of business processes that enable an organization to identify, select, acquire, and serve its customers.

With each technological advancement, especially the advent of self-service channels like the World-Wide-Web, customers are becoming more dispersed. Consequently, more organizations are beginning to manage customer relationships electronically. This requires constant innovation and continuous monitoring of user satisfaction.

Conventional techniques for determining user satisfaction involve obtaining explicit feedback from users. For example, explicit user ratings may be evaluated subsequent to customer interactions (or parts thereof). Often, traditional techniques for obtaining feedback and determining user satisfaction include surveys. The development, dissemination, and collection of surveys, however, is often time- and labor-intensive. Some organizations also dedicate staff to contact customers by telephone or meet with them in person to obtain feedback. Still others incur the expense of printing and mailing surveys in a direct mail campaign. All of these techniques suffer because they depend on a customer providing responses in the first instance, and providing honest responses in the second. Even an Internet or web survey, which may be less costly to administer, is only effective if customers respond and respond honestly.

Obtaining honest responses is a significant problem. Customers generally respond to satisfaction surveys only if they can discern some potential benefit. If a customer's perception of a product is so low to preclude further use, the customer will often not bother to respond to a survey. Yet these are the very people whose feedback is critical.

SUMMARY

Methods and systems consistent with the present invention may detect user satisfaction based on user interaction patterns and properties. Methods and systems may monitor an interaction between a user and a computer and may compare the monitored interaction with a baseline value to determine a deviation from a baseline. Methods and systems may use the deviation to determine a value for user satisfaction.

Methods and systems consistent with the present invention may improve user satisfaction. Methods and systems may track user actions during an interaction with an application and determine if the user actions deviate from an application script corresponding to the interaction. A link from a deviated action to a next logical point in a task script may be provided.

The foregoing background and summary are not intended to be comprehensive, but instead serve to help artisans of ordinary skill understand the following implementations consistent with the invention set forth in the appended claims. In addition, the foregoing background and summary are not intended to provide any independent limitations on the claimed invention.

BRIEF DESCRIPTION OF THE DRAWINGS

The accompanying drawings show features of implementations consistent with the present invention and, together with the corresponding written description, help explain principles associated with the invention. In the drawings.

DETAILED DESCRIPTION

The following description refers to the accompanying drawings, in which, in the absence of a contrary representation, the same numbers in different drawings represent similar elements. The implementations set forth in the following description do not represent all implementations consistent with the claimed invention. Instead, they are merely some examples of systems and methods consistent with the invention. Other implementations may be used and structural and procedural changes may be made without departing from the scope of present invention.

Consistent with principles and aspects of the present invention, methods and systems may implicitly detect user satisfaction based on user interaction patterns and properties. For example, if a user performs a search using a search engine, the user's level of satisfaction pertaining to the search results may be determined by how the user interacts with the system following display of the results. For instance, if the user takes some further action with regard to the results, particularly the highest ranked results, the user is likely satisfied. If the user takes no further action with any of the results, the user may be dissatisfied with the results.

Methods and systems may also determine user satisfaction based on the utility of an action or properties and/or utilities of an application script. For example, if an electronic transaction to purchase an item fails, user dissatisfaction may be determined based on the utility or value of the item purchased, as it is generally human nature to be more dissatisfied with a failed transaction involving a high-value item versus a low-value item.

The foregoing discussion is intended to introduce and provide initial clarity for some of the aspects associated with the present invention. Further details of these embodiments as well as additional aspects and embodiments of the present invention will be described below.

Figure 1:
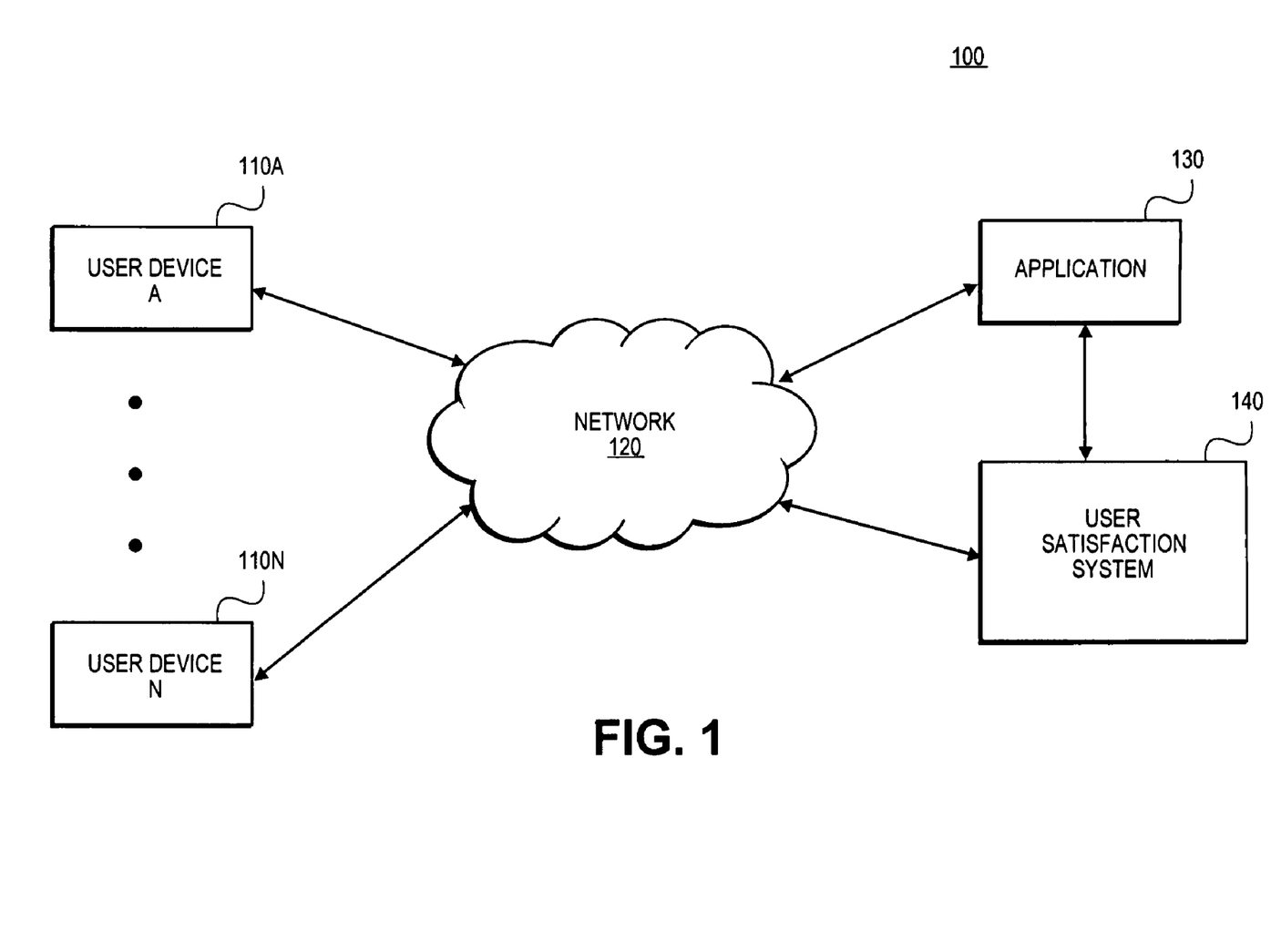
FIG. 1 block diagram of an architecture showing features and aspects consistent with the present invention.

FIG. 1 is a block diagram of an architecture 100, compatible with features and aspects consistent with the present invention. Architecture 100 includes user devices 110A-110N, a network 120, an application 130, and a user satisfaction system 140.

User devices 110A-110N may include devices that enable a user to access information remotely. For example, user devices 110A-110N may be implemented using devices capable of accessing the Internet, such as a general purpose computer or personal computer equipped with a modem. User devices 110A-110N may also be implemented in personal digital assistants (PDAs), pagers, and/or mobile communications devices (e.g., cell phones).

In certain embodiments, user devices 110A-110N may facilitate instant messaging or use other aspects of TCP/IP including the hypertext transfer protocol; the user datagram protocol; the file transfer protocol; the hypertext markup language; and the extensible markup language ("XML").

Network 120 may be the Internet, a virtual private network, a local area network, a wide area network, a broadband digital network or any other structure for enabling communication between two or more nodes or locations. Network 120 may include a shared, public, or private data network and encompass a wide area or local area. Network 120 may include one or more wired or wireless connections and may employ communication protocols such as TCP/IP, ATM, Ethernet, or any other compilation of procedures for controlling communications among network locations.

Network 120 may also include or provide telephony services, and thus may include or leverage a Public Switched Telephone Network ("PSTN"). Alternatively, network 120 may leverage voice-over Internet Protocol technology.

Various components within environment 100 may connect to network 120 by communication devices and software commonly employed by Internet Service Providers (ISPs) or as part of an Internet gateway. Such components may be assigned a network identifier (ID). The term "ID" refers to any symbol, value, tag, or identifier used for addressing, identifying, relating, or referencing a particular element. Network IDs may include IP addresses.

Application 130 may include any type of program or environment designed to perform one or more specific functions for one or more users or other devices. Examples of applications include programs, such as text editors, spreadsheets, and presentation software, and applications that run on the Internet, such as web sites used to gather information, search engines, web purchasing sites, or travel planning sites. Application 130 may also represent a word processor, a database program, a business intelligence application, a development tool, a scheduling tool, a routing tool, a communication tool, a menu interface, an e-commerce web site, a help-desk environment, a multimedia tool, an audio or video editing program, and any combination thereof. Application 130 may be a compilation of instructions for manipulating data written in any structural, procedural, object-oriented, or other type of programming language. In certain configurations, application 130 may comprise a user interface such as a GUI for facilitating using interaction with the application.

For the sake of brevity, a single application is illustrated. However, any number of geographically-dispersed applications may be included in application 130. User satisfaction system 140 may be an element of, or integrated in, application 130. User satisfaction system 140 may also be a stand-alone application, which may be leveraged by one or more applications.

Figure 2:
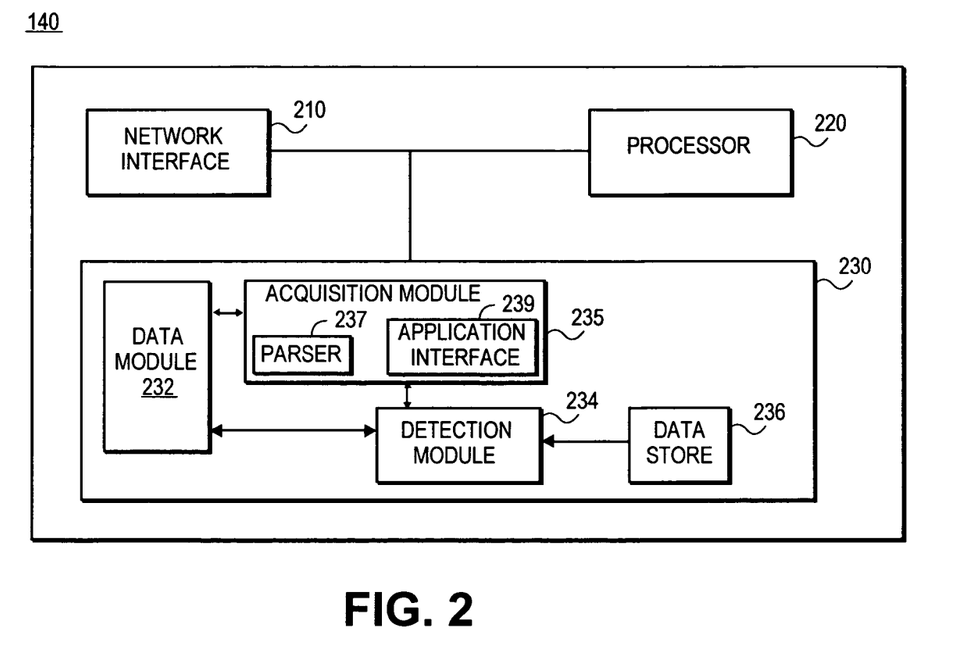
FIG. 2 is a block diagram of a user satisfaction system, consistent with the present invention.

FIG. 2 is a block diagram illustrating an exemplary implementation of user satisfaction system 140 depicted in FIG. 1. User satisfaction system 140 may include a network interface 210, a processor 220, a data module 232, a detection module 234, a data store 236, and an acquisition module 235, which may further include a parser 237 and an application interface 239.

Data module 232 may include any mechanism, device, or structure for managing, accessing, and updating an aggregation of data. Data module 232 may include one or more structured data archives distributed among one or more network-based data processing systems. Data module 232 may also include a relational database, distributed database, or an object-oriented programming database. In certain implementations, data module 232 may serve as a repository of application scripts.

As used herein, the term "application script" refers to one or more actions which may manipulate objects and which may be performed by a user interacting with application 130 to obtain a desired result. The term "action" refers to any act, experience, behavior, conduct, event, selection, expression, or input associated with a user. For example, in an e-commerce environment, actions may include selecting, via a mouse, a particular item in a menu or entering textual data in a field. A single action, however, may not necessarily correlate to a single user act. For example, a series of mouse clicks could constitute a single action. An application script may comprise all, or a portion of, the actions a given user may perform during his or her interaction with application 130.

As mentioned above, application scripts may be stored. Consistent with principles of the invention, methods and systems may maintain objects, actions, and scripts as elements of a respective ontology: An object or domain ontology may describe objects, object properties, and object relations, which may be enhanced with utility annotations according to their values in a normative system that forms a basis for satisfaction detection. An action ontology may describe and annotate actions according to normative evaluations. A script (or task) ontology may describe sequences or graphs of actions annotated. Consistent with principles and aspects of the present invention, methods and systems may define, maintain, and leverage such ontologies and may store objects, actions, and scripts as elements of such ontologies. Further, systems and methods may define, maintain, and leverage one or more normative systems or lexicons, which may form, partially or entirely, the basis for detecting satisfaction.

An application script may be supplemented to include a utility value for each action comprising the application script. The term "utility value" refers to an indicator or property of an action, the indicator representing the value of the action or its importance to the user. The greater the user commitment, which may be monetary or based on responsibility or effort, the greater the utility. In accordance with aspects of the invention, a utility value may be any symbol, value, tag, or alphanumeric designator for identifying and referencing the utility of an action to the user. Consistent with certain aspects of the invention, a utility value for a script may be composed from utilities of participating objects, utilities of actions, and values computed with respect to deviations of a session (or part of a session) and a script. In one configuration, utility values may be maintained in a lookup table and stored in data module 232. Further details related to application scripts and utility values will be discussed in connection with FIG. 3.

Acquisition module 235 may be configured to retrieve and manage user session information from application 130. Module 235 may be implemented by one or more software, hardware, or firmware components. A "session" may comprise all or some portion of the actions a user performs during his interaction with application 130. In one configuration, a session may span from the time a user logs on until the user logs off. A session, however, may comprise any number of scripts, and acquisition module 235 may contain any number of sessions.

Acquisition module 235 may, for each session, store a description of the session. The description of a given session may include: (1) a session identifier; (2) an application identifier; (3) a client identifier; (4) a user identifier; and (5) a time/date stamp. As used herein, the term "identifier" refers to any symbol, value, tag, or alphanumeric designator for identifying the associated element (e.g., session, application, user). The time stamp may reflect the time or date that a particular session was created and/or entered into acquisition module 235.

Acquisition module 235 may also store, for each session, information associated with session constituents. As explained above, a session comprises a sequence of actions. Each action may, therefore, be represented in acquisition module 235 as a symbol. These action symbols or "features" may be any value, tag, or alphanumeric designator identifying or referencing a particular action.

In one implementation, acquisition module 235 may include or be coupled to a relational database, distributed database, object-oriented programming database, or any other mechanism, device, or structure for managing, accessing, and updating an aggregation of data. Acquisition module 235 may include one or more structured data archives distributed among one or more network-based data processing systems.

Information may be stored in acquisition module 235 via one or more tables. For example, a session table may be included in acquisition module 235 for maintaining session descriptions. Acquisition module 235 may also include an occurrence table for maintaining each feature, along with each feature's respective session identifier. Acquisition module 235 may also contain a parser 237 and an application interface 239.

Application interface 239 may be any mechanism, program, algorithm, or scheme for linking application 130 with acquisition module 235. Application interface 239 may facilitate data exchange between application 130 and acquisition module 235. In one embodiment, XML may be employed to facilitate the data exchange between application 130 and acquisition module 235. The Standard Generalized Markup Language or any other language that facilitates the creating and sharing of common information formats may be used.

Acquisition module 235 may also be configured to retrieve information from application interface 239 and arrange the information in a form corresponding to data structures used to store application scripts in data module 232. This may be performed via parser 237, which may include any mechanism, program, algorithm, or scheme for separating sequential information into segments that can be managed or used by another component. In one configuration, parser 237 may be an XML parser.

Application scripts and utility data may be stored in data module 232. Data module 232 may contain more than one application script, and the application scripts in data module 232 may represent more than one application.

Acquisition module 235 may be linked to detection module 234. Detection module 234 may be configured to receive or retrieve a parsed session from acquisition module 235, as well as receive or retrieve application scripts from data module 232. As discussed above, parser 237 of acquisition module 235 may arrange session data in a format that corresponds to data structures representing an application script. This will allow detection module 234 to compare sequential actions in an application script to session features or action segments received from acquisition module 235.

Detection module 234 may be any mechanism, program, algorithm, or scheme for comparing session features and application scripts. Detection module 234 may include an interface for linking to data module 232 and acquisition module 235. Such an interface may include or leverage a transfer function for linking.

Detection module 234 may receive or retrieve application scripts based on the application identifier in the session description. Detection module 234 may also be configured to identify the corresponding application script by comparing session features to application scripts in data module 232.

After receiving or retrieving a session and the corresponding application script, detection module 234 may detect any loops that occurred during the session. As used herein, "loop" refers to actions in a session between which a user deviates from the application script. Detection module 234 may also detect actions after which a user abandons an application script.

In one configuration, detection module 234 may arrange and prepare for storage, information regarding loops and points at which a user abandons an application script. This information may be stored via one or more tables in a data store 236. Data store 236 may also include an occurrence table for maintaining each loop, along with its frequency of occurrence, in respective applications or sessions.

While deviations with respect to session features and/or sequence level may be detected and indicate satisfaction, script utilities may also influence satisfaction. For example, a script for information gathering (e.g., a catalog search in a product catalog) may be less satisfying if it fails than a purchase script. Consistent with aspects of the invention, detection module 234 may evaluate script utilities and may arrange and prepare for storage information regarding script utilities.

Figure 3:
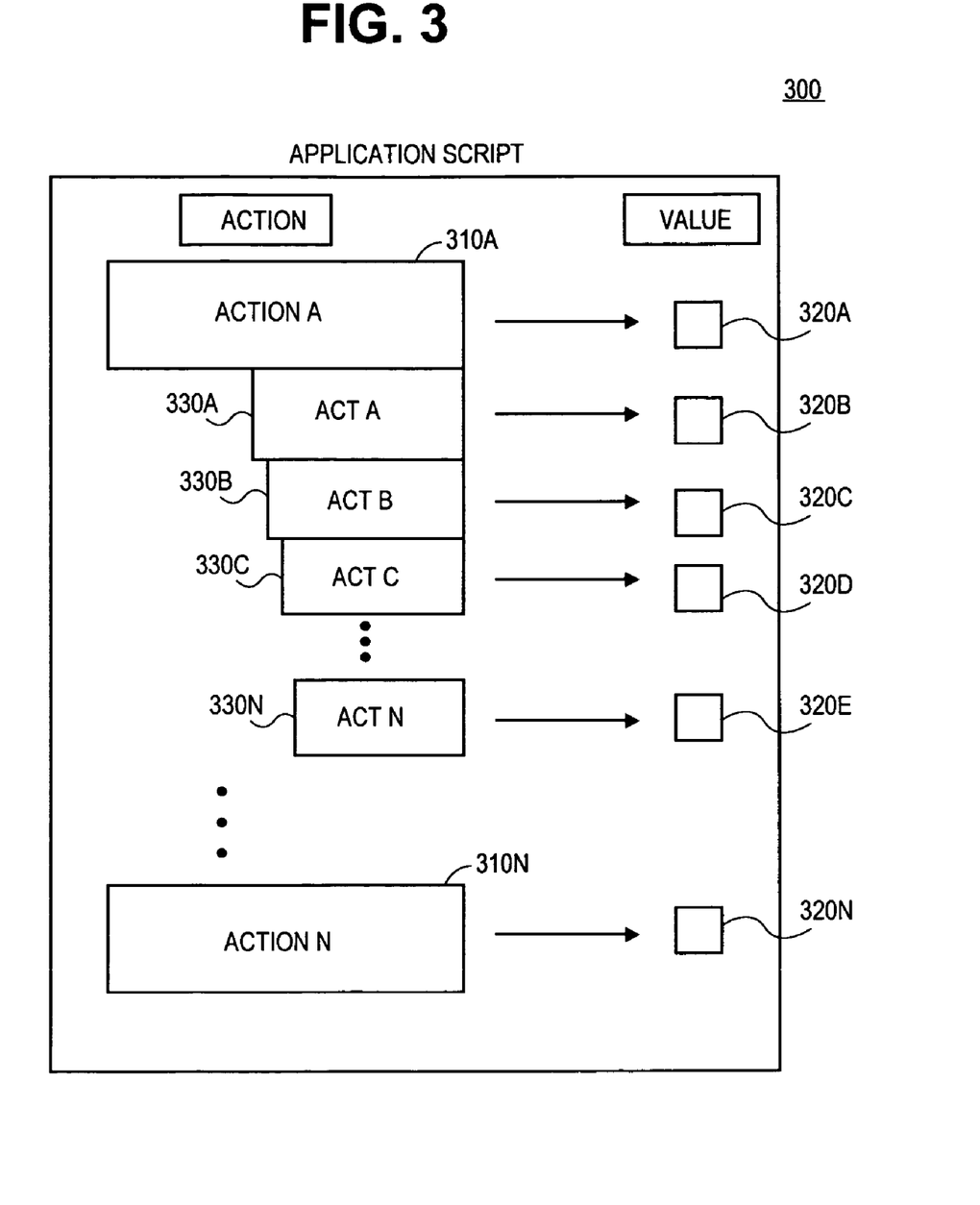
FIG. 3 is a block diagram of an application script consistent with the present invention.

FIG. 3 is a block diagram of an exemplary application script 300, which includes actions 310A-N and values 320A-N. Action 310A includes acts 330A-N. Application script 300 may represent a logical sequence of actions 310A-N that a user may perform when interacting with application 130 to obtain a desired result. Application script 300 may include one or more actions 310, and a single action may include one or more user acts 330. For example, application script 300 for performing a query using a search engine application may include actions such as enter query term, mouse click the search button, and mouse click the first and each sequential display result. Each step may constitute a single action or, for example, enter the query term and mouse click the search button may be combined to create a single action. A systems administrator may create application script 300, or an expert system may create application script 300 dynamically.

Once application script 300 is created, a utility value, or value 320, may be assigned to each action 310 comprising application script 300. Value 320 may be any symbol, value tag, or alphanumeric designator for identifying and referencing the utility of an action to the user. For the sake of simplicity, the following discussion addresses values in numeric form, but other value forms are possible, such as linguistic expressions describing prototypical user experience. Such expressions may include, for example, {difficult}, {cumbersome}, {awkward}, {tedious}, etc. Linguistic expressions may also include expressions concerning aspects of an application, such as {important}, {critical}, {required}, {optional}, etc. Additionally, "gradators" may be associated with values. A "gradator" may include any indicator of degree, shade, and/or arrangement. For example, the linguistic expression {tedious} may be preceded by a gradator such as {very}, {rather}, or {somewhat}. Gradators and values may be of the same form or of dissimilar forms.

Consistent with aspects of the invention, methods and systems may map value and gradator forms. Methods and systems may map certain values of a particular form to one or more other forms. Gradators and gradator-value combinations may also be mapped. For example, a lookup table may map the linguistic expression {critical} to a numeric value of 0.8 and the linguistics gradator-value combination {very critical} to a numeric value of 0.9. Such a lookup table may map a plurality of varying value forms.

Values may correlate to importance. That is, the more important or significant action 310 is to the user, the greater its value may be. This value may be based on the level of commitment at stake for the user and properties or characteristics of an action relative to other actions in the sequence. An action within a script may be evaluated according to the goal of the script. For example, an action to rearrange a screen layout might be less valuable in a purchase script than it would be in a layout configuration script. Each component in a script may, therefore, be annotated with a script-dependent utility basis.

For example, if a user creates a very long electronic document and after entering a "save" command application 130 loses the document, the user may be extremely dissatisfied. If, however, a user is performing a very short query using a search engine, and application 130 fails after the user enters the query term, but before any results are displayed or viewed, the user may be only mildly dissatisfied.

Alternatively, a value may be assigned to an action without considering the hierarchy or stages within application script 300. Value 320 may also be assigned without reference to a particular application.

Figure 4:
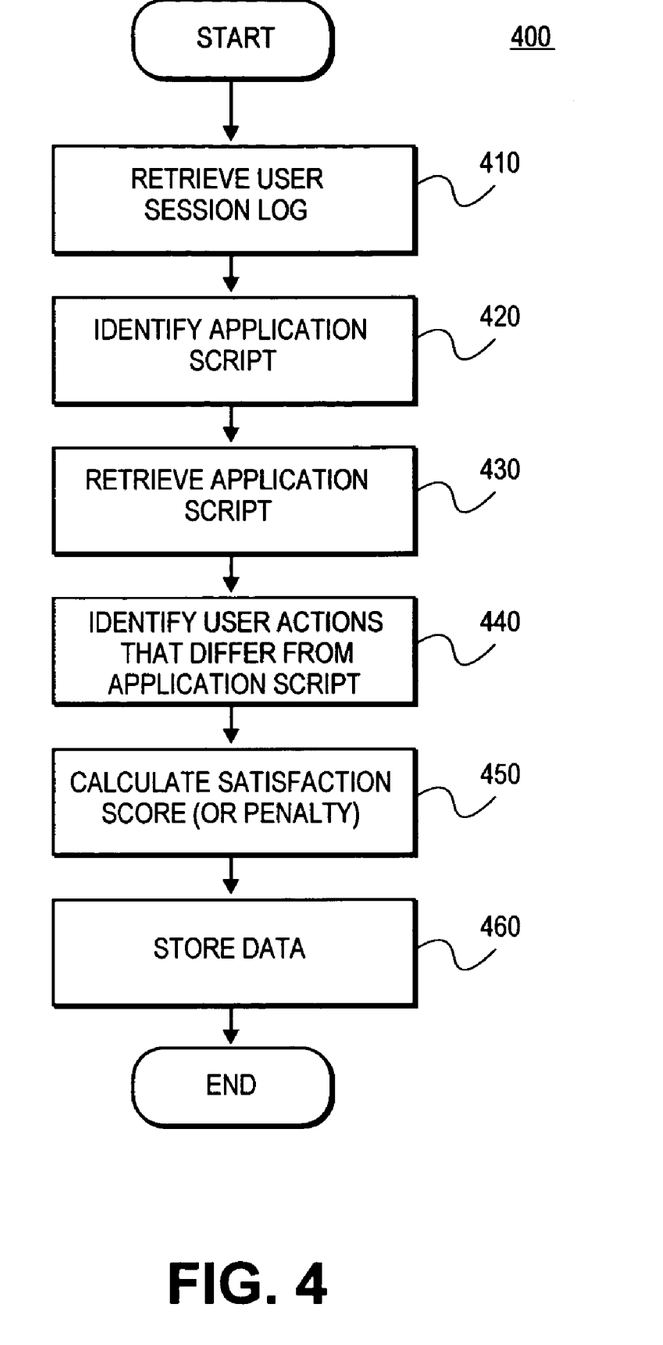
FIG. 4 is a flowchart depicting a method for determining user satisfaction consistent with the present invention.

FIG. 4 is a flow diagram of a method for determining user satisfaction. The illustrated process may begin when a user session log is retrieved from an application (step 410). Application interface 239 in module 235 may retrieve session logs. A session, upon completion, may be transferred automatically from application 130 via application interface 239. A session may be transferred from application 130 in its entirety, including all actions 310 performed by the user.

Once a session is received via application interface 239, the session may be parsed (e.g., by parser 237) into single features, with each feature representing a single action. The parsed session may then undergo further formatting via parser and may be logged and stored in acquisition module 235. Session data stored in acquisition module 235 may include: (1) a session identifier, (2) an application identifier, (3) a client identifier, (4) a user identifier, (5) a time/date stamp, and (6) a sequence or list of actions performed by the user. Each action may be represented as an action symbol or feature.

Based on the user session, a related application script may be identified (step 420) and retrieved (step 430) (e.g., by detection module 234). The corresponding application script may be retrieved from data module 232, based on the application identifier contained in the session description. Alternatively, detection module 234 may compare the session to application scripts in data module and, based on predetermined criteria, retrieve the corresponding application script. Again, an application script represents the preferred or more logical sequence of actions for obtaining a desired result.

The application script and user session log may be compared (e.g., by detection module 234) to identify actions that are different (step 440). Such differences may be used to calculate a user satisfaction score or penalty (step 450). Detection module 234 may then compare the session to the selected application script. If a session is satisfactory, the user will proceed to a logical next action in accordance with the application script. If the user repeats an action or pursues an alternative, the session is likely unsatisfactory. For example, if action sequences in the session correspond to action sequences in the application script, and the desired goal is attained, the user is presumably satisfied. If the session is dissimilar to the application script, however, the user is likely dissatisfied. The degree of dissatisfaction may depend on the number of deviations or detours from the application script performed by the user. In an exemplary embodiment, values may be accumulated for each action within a session that corresponds to the application script. Values for actions that differ or deviate from the application script may be subtracted. The resultant value is an indicator of user satisfaction.

The data generated by the comparison may be stored for use in future analysis (step 460). Data related to user satisfaction may be compiled and stored in data store 236. Upon further analysis by a system administrator or expert system, several courses of action may be taken to improve user satisfaction. These include (1) creating a shortcut between actions where deviations frequently occur, (2) mapping incorrect of deviant actions to actions in accordance with the application script, (3) recommending a prescribed sequence of actions to the user before a deviation occurs, and/or (4) modifying the application script.

Figure 5:
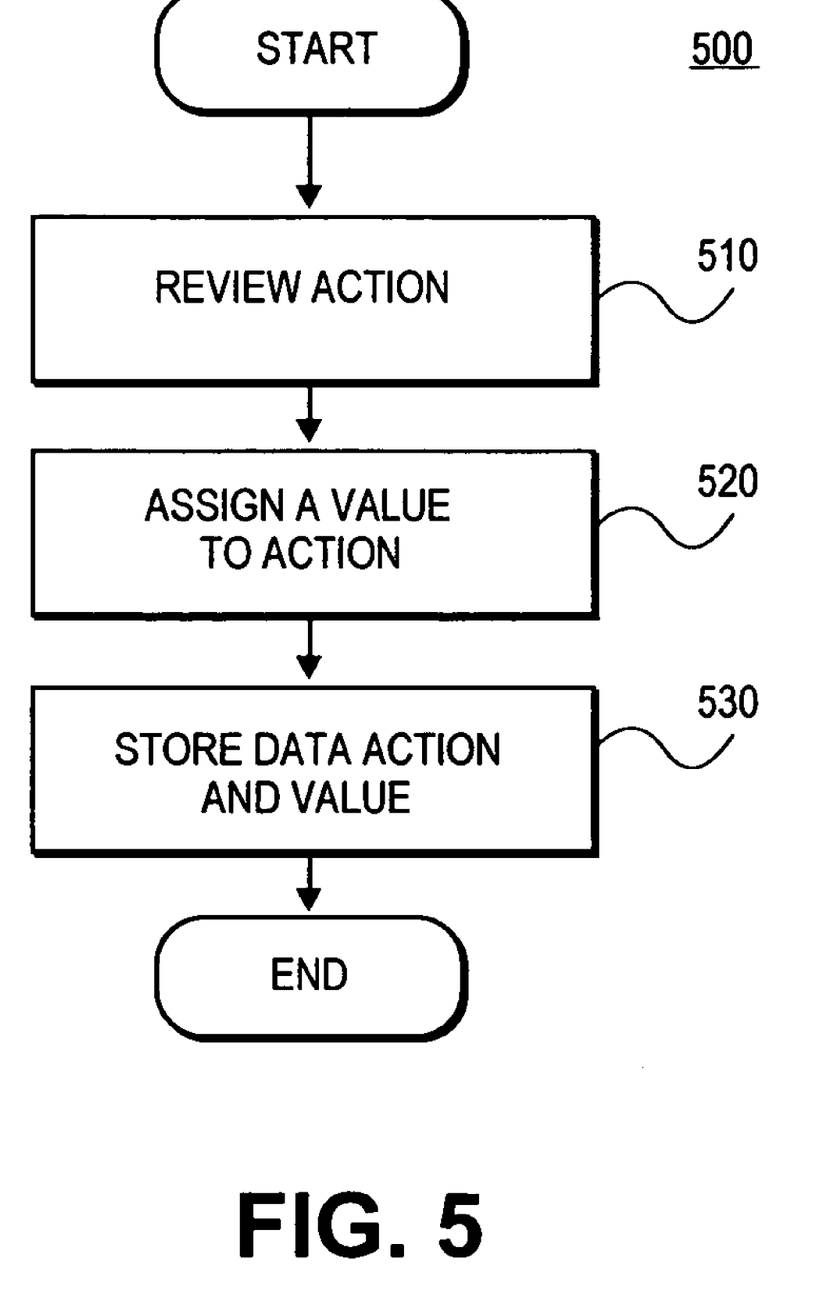
FIG. 5 is a flowchart depicting a method for defining actions consistent with the present invention.

FIG. 5 is flowchart depicting a method for defining actions. When an application script is generated, the script may be parsed (e.g., via parser 237) into single features, with each feature representing a single action. The action may be reviewed to determine the type and scope of activity associate with the action (step 510). Based on the type and scope of activity associated with an action, a value may be assigned to the action (step 520). Then, the action may be stored with the associated value (e.g., in data store 232 and/or acquisition module 235) (step 530). The stored value may be used with other application scripts to generate a consistent indication of user satisfaction.

Figure 6:
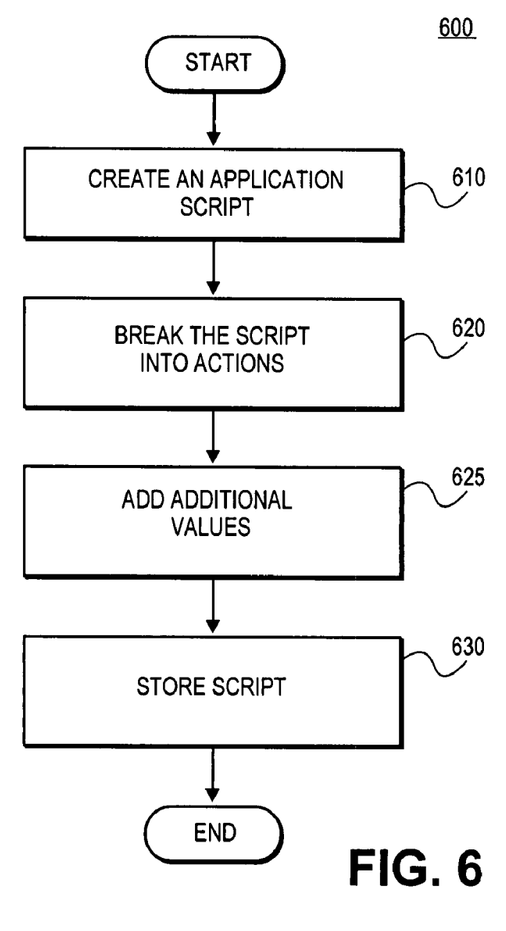
FIG. 6 is a flowchart depicting a method for generating application scripts consistent with the present invention.

FIG. 6 is a flowchart depicting a method for generating application scripts. The illustrated process may involve creating an application script (step 610). In certain embodiments, a systems administrator may create application script 300. Alternatively, an expert system can create application script 300 dynamically. The script may be broken down into individual actions (step 620). The script may be parsed (e.g., via parser 237) into single features, with each feature representing a single action. Further, actions may be broken down into features representing acts, which make up an action. Each action, or part of an action (an act) may include an associated utility value. Additional values may then be added to the application script (step 625). Additional values may be necessary for specific combinations of actions that have heightened importance, such as the steps in generating a credit card payment. Finally, the application script may be stored (e.g., in data module 232) for use in future comparisons (step 630).

Figure 7:
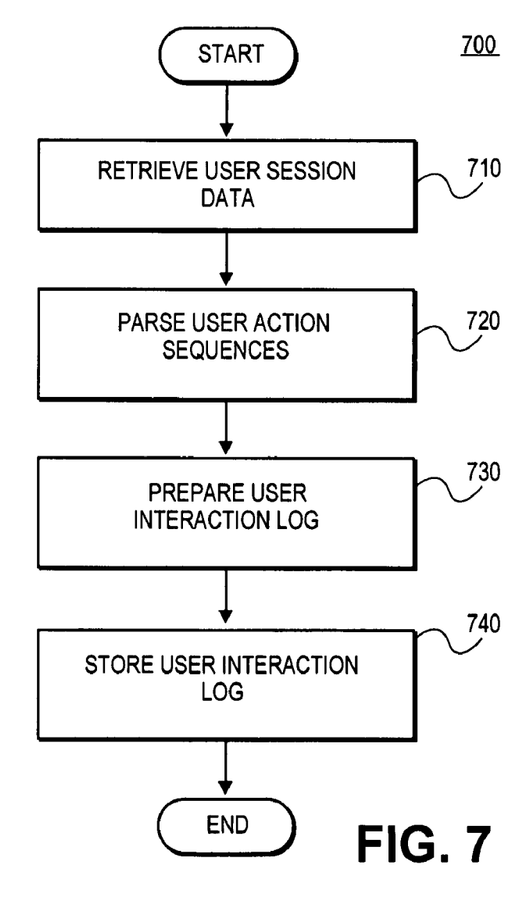
FIG. 7 is a flowchart depicting a method for acquiring a user interaction log consistent with the present invention.

FIG. 7 is a flowchart depicting a method for acquiring a user interaction log. The illustrated process may involve retrieving (e.g., by acquisition module 235) user session data (step 710). This data may then be parsed to determine user action sequences (step 720). Based on the combination of user action sequences, a user interaction log may be generated (step 730). This user interaction log may then be stored for determining user satisfaction (step 740).

Additional options associated with the user satisfaction system may include modifying application scripts based on user actions. If a number of users all make the same deviations from an application script, this may be an indication that the application script is not ideal and needs to be modified to reflect true user action. In an alternative, the consistent deviation from the application script may suggest that the application has some fundamental errors and needs to be modified.

User satisfaction system 140 may also prompt a user with an action sequence according to the application script. In certain embodiments, the analysis of user satisfaction may take place while the user is interacting with the application. If user satisfaction system 140 notices a user deviating from an appropriate application script, the system may direct the user, ideally avoiding some or all of potential user dissatisfaction before it occurs.

Consistent with aspects of the present invention, user satisfaction system 140 may map deviating user actions to actions in accordance with the application script. In some cases, the user satisfaction (as measured by other systems) may be high, but the application script associated with the user actions indicates a low satisfaction. When this type of deviation occurs, the user actions may be mapped to an application script for use in future evaluation.

For clarity of explanation, environment 100 is described herein with reference to the discrete functional elements illustrated in FIGS. 1-3. It should, however, be understood that the functionality of the illustrated elements and modules may overlap and/or may exist in a fewer or greater number of elements and modules. Elements of each system may, depending on the implementation, lack certain illustrated components and/or contain, or be coupled to, additional or varying components not shown. Further, all or part of the functionality of the illustrated elements may co-exist or be distributed among several geographically dispersed locations. Moreover, embodiments, features, aspects and principles of the present invention may be implemented in various environments and are not limited to the illustrated environments. Further, the processes disclosed herein are not inherently related to any particular apparatus or system and may be implemented by any suitable combination of components.

In addition, FIGS. 4-7 are consistent with exemplary implementations of the present invention. Further, the sequence of events described in FIGS. 4-7 are exemplary and not intended to be limiting. Other steps may therefore be used, and even with the methods depicted in FIGS. 4-7, the particular order of events may vary without departing from the scope of the present invention. Moreover, certain steps may not be present and additional steps may be implemented in FIGS. 4-7.

The foregoing description of possible implementations consistent with the present invention does not represent a comprehensive list of all such implementations or all variations of the implementations described. The description of only some implementation should not be construed as an intent to exclude other implementations. Artisans will understand how to implement the invention in the appended claims in may other ways, using equivalents and alternatives that do not depart from the scope of the following claims. Moreover, unless indicated to the contrary in the preceding description, none of the components described in the implementations is essential to the invention.

What is claimed is:

1. A method for detecting user satisfaction, the method being performed by execution of computer readable program code by at least one processor of at least one computer system, the method comprising:
   monitoring, using the at least one processor, an interaction between a user and a computer via an acquisition module on the computer that tracks user actions, the monitoring generating a user interaction log describing at least one interaction between the user and the computer, the monitoring identifying an application script based on an interaction included in the user interaction log, the application script created by (i) defining action sequences, (ii) assigning a utility value to each action sequence, (iii) developing a script of action sequences for an application, and (iv) storing the script of action sequences for the application;
   comparing, using the at least one processor, the monitored interaction with a baseline value to determine a loop in the interaction, wherein the loop is a deviation from baseline;
   determining, using the at least one processor, a value for user satisfaction using the deviation; and
   providing data characterizing the user satisfaction for user satisfaction analysis for display to a system administrator or an expert system.

2. The method of claim 1, wherein comparing further includes:
   assessing a penalty for every loop in the user interaction log.

3. The method of claim 1, wherein generating the user interaction log includes:
   retrieving a user session with an application;
   parsing the user session for action sequences;
   preparing the user interaction log; and
   storing the user interaction log.

4. The method of claim 1, wherein the application script corresponds to expert user actions.

5. The method of claim 1, wherein comparing includes comparing the user interaction log to the identified application script.

6. The method of claim 5, wherein using the deviation includes determining a deviation index representing a deviation between the user interaction log and the application script.

7. The method of claim 6, wherein using the deviation includes correlating the deviation index to a user satisfaction level.

8. The method of claim 1 further including assessing the value of the interaction to determine the deviation.

9. The method of claim 1, wherein comparing includes assessing a severity of difference between the monitored interaction and the baseline value to determine the deviation.

10. A computer system including at least one processor and a memory coupled to the at least one processor, the memory encode one or more programs that cause the at least one processor to perform operations comprising:
   monitoring, using the at least one processor, an interaction between a user and a computer via an acquisition module on the computer that tracks user actions, the monitoring generating a user interaction log describing at least one interaction between the user and the computer, the monitoring identifying an application script based on an interaction included in the user interaction log, the application script created by (i) defining action sequences, (ii) assigning a utility value to each action sequence, (iii) developing a script of action sequences for an application, and (iv) storing the script of action sequences for the application;
   comparing, using the at least one processor, the monitored interaction with a baseline value to determine a loop in the interaction, wherein the loop is a deviation from baseline;
   determining, using the at least one processor, a value for user satisfaction using the deviation; and providing data characterizing the user satisfaction for user satisfaction analysis for display to a system administrator or an expert system.

11. The computer system of claim 10, wherein comparing further includes:
assessing a penalty for every loop in the user interaction log.

12. The system of claim 10, wherein generating the user interaction log includes:
retrieving a user session with an application;
parsing the user session for action sequences;
preparing the user interaction log; and
storing the user interaction log.

13. The system of claim 10, wherein the application script corresponds to expert user actions.

14. The system of claim 10, wherein comparing includes comparing the user interaction log to the identified application script.

15. The system of claim 14, wherein using the deviation includes determining a deviation index representing a deviation between the user interaction log and the application script.

16. The system of claim 15, wherein using the deviation includes correlating the deviation index to a user satisfaction level.

17. The system of claim 10, wherein the operations further comprise: assessing the value of the interaction to determine the deviation.

18. The system of claim 10, wherein comparing includes assessing a severity of difference between the monitored interaction and the baseline value to determine the deviation.

* * * * *

UNITED STATES PATENT AND TRADEMARK OFFICE
CERTIFICATE OF CORRECTION

PATENT NO. : 7,587,324 B2  
APPLICATION NO. : 10/811971  
DATED : September 8, 2009  
INVENTOR(S) : Matthias Kaiser Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1398 days.

Signed and Sealed this

Twenty-first Day of September, 2010

David J. Kappos
*Director of the United States Patent and Trademark Office*